United States Patent [19]
Del Favero

[11] Patent Number: 5,144,988
[45] Date of Patent: Sep. 8, 1992

[54] WEFT FEEDER WITH INSTRUMENT FOR MEASURING YARN TENSION

[75] Inventor: Angelo Del Favero, Crescentino, Italy

[73] Assignee: ROJ Electrotex S.P.A., Biella, Italy

[21] Appl. No.: 706,193

[22] Filed: May 28, 1991

[30] Foreign Application Priority Data

May 28, 1990 [IT] Italy ................ 20442 A/90

[51] Int. Cl.[5] .......................................... D03D 47/30
[52] U.S. Cl. ................... 139/452; 139/435.2; 73/862.473
[58] Field of Search ..................... 73/862.48; 139/452, 139/435.2; 242/148

[56] References Cited

U.S. PATENT DOCUMENTS 4,932,442  6/1990  Ishido et al. ............... 139/435.2
5,050,648  9/1991  Pezzoli ...................... 139/452

FOREIGN PATENT DOCUMENTS

2433394   1/1975  Fed. Rep. of Germany .
2621196  12/1977  Fed. Rep. of Germany .
WO87/04418 7/1987  World Int. Prop. O. .

Primary Examiner—Andrew M. Falik
Attorney, Agent, or Firm—Young & Thompson

[57] ABSTRACT

An instrument for measuring the tension of yarns—particularly weft yarns which wind or unwind forming a "balloon"—avoiding further deviations thereof, which makes use of a variable impedance, for example a differential capacitor or a variable inductor, comprising a movable component and at least one fixed component as parts of an electric measuring circuit. All the components of the instrument have a centered symmetry and a passage through their center for the yarn whose tension has to be measured, with a yarn guiding and deviating eyelet positioned in correspondence of the closing vertex of the "balloon" and fixed to the movable component of the variable impedance. The variable voltage detected on one of the components of the impedance, as a function of the tension of the yarn sliding through the eyelet, is measured by a measuring device connected to the movable component. A weft yarn feeder for looms, having at its outlet an instrument with centered symmetry as described hereabove, positioned on the main axis of the weft feeder so as to measure the tension of the unwinding yarn being fed to the loom is also disclosed.

17 Claims, 7 Drawing Sheets

WEFT FEEDER WITH INSTRUMENT FOR MEASURING YARN TENSION

BACKGROUND OF THE INVENTION

The present invention generally concerns an instrument for measuring the tension of yarns—particularly weft yarns which wind or unwind forming a "balloon'-'—in any yarn treatment operation in the weaving and spinning fields and, specifically, in weft yarn feeding to looms by means of weft feeders.

The invention also concerns a weft feeder equipped with an instrument of the type specified heretofore.

The main and more general object of the invention is to measure the tension of a yarn without forcing it to undergo further deviations—as it happens at present with the conventional devices—when a "balloon" is formed due to yarn operating conditions, but taking instead advantage of the vertex of the "balloon" both in the "defile" unwinding of the yarn (as at the outlet of a loom weft feeder) and in the winding thereof (as at the inlet of a spinner).

A further object of the invention is to improve weft yarn feeding to looms by making use of weft feeders to which there is associated an instrument for measuring yarn tension in the aforementioned way, and using the data of the measurements carried out with the instrument in order to influence the treatment operations to which the weft yarn being fed is subjected.

Considering in particular the case of loom feeding, it has to be taken into account that—as known—the efficiency of modern looms is highly influenced, in terms both of quantity and of quality of the product, by the tension of the weft yarn with which they are fed. This tension does not only depend on the type and characteristics of the yarn and on the kind of weaving being performed, but also on a large number of other parameters subjected to variations which are difficult to quantify. These variations may be, due to differences in the features of the yarn reels, both in each reel and between one reel and the next (even forming part of a same lot), or to the change of environmental conditions, to the ageing of the parts of the weaving system, and so on. Furthermore, the adjustments of the brake members are carried out nowadays in a qualitative way, leaving the delicate task of the most appropriate choices to the sensitiveness and experience of the operator, which are not always adequate.

Hence, it appears of utmost interest to be able to obtain a quantitative information on the braking conditions of the weft yarns fed to a loom, in the form of numerical indications of the tension expressed in units of absolute or relative force onto a suitable visualizer, and to use this information so as to automatically and continuously adjust the brake members in order to guarantee the constancy of the tension in the long run.

This is very efficiently obtained with the tension measuring instrument proposed by the present invention which, as already mentioned, by no means modifies—as it negatively occurs instead with the devices adopted up to date—the normal yarn feeding path from the weft feeder to the loom.

SUMMARY OF THE INVENTION

The present invention therefore supplies an instrument for measuring the tension of yarns—particularly weft yarns which wind or unwind forming a "balloon'-'—avoiding further deviations thereof, of the type using a variable impedance comprising a movable component and at least one fixed component as parts of an electric measuring circuit. The instrument characterized in that all its components have a centered symmetry and a passage through their center for the yarn whose tension has to be measured, with a yarn guiding and deviating eyelet positioned in correspondence of the closing vertex of the "balloon" and fixed to the movable component of the variable impedance, the variable voltage detected on one of the components of said impedance, as a function of the tension of the yarn sliding through said eyelet, being measured by a measuring device connected to said movable component.

The variable impedance of said instrument can consist of a differential capacitor or of a variable inductor.

In the first case—which seems at present the most practicable from the constructive point of view—the differential capacitor comprises four side-by-side surfaces having a centered symmetry and a central passage along their common axis. Two of said surfaces form a first fixed component, the third one forms a second fixed component, and the fourth one forms the movable component of the capacitor. The components are kept reciprocally spaced by insulating spacers, and the fixed components are fed with a constant voltage by a high-frequency generator, while the movable component is connected to a device measuring the voltage thereon. The first of the fixed components suitably forms the cold plate of the differential capacitor and, at the same time, acts as a protective screen therefor, while the second component forms its hot plate.

The surfaces forming the fixed components and the movable component of the differential capacitor can be either metallic laminae or, at least partly, metal surfaces on ceramic supports.

The invention also concerns a weft feeder for looms, characterized in that it comprises, at its outlet, an instrument with centered symmetry as described heretofore, positioned on the main axis of the weft feeder so as to measure the tension of the yarn unwinding from its drum and being fed to the loom on which the feeder is applied, avoiding to impart on the yarn any deviations other than that conventionally imparted thereon.

When the feeder is of the type having brake devices suited for gripper looms, means can be provided therein—using the signals of the instrument which represent the tension of the unwinding yarn—to check and modulate the tension, by adjusting the brake devices of the weft feeder.

The means operate by comparing the signals with reference signals indicating the tension required for the unwinding yarn being fed to the loom on which the feeder is applied.

Alternatively, when the feeder is of the measuring type suited for fluid jet looms, means can be provided—associated therewith or with the loom—which use the signals of the instrument in order to regulate the fluid pressure operating the loom and/or its operating times, with a feedback action.

BRIEF DESCRIPTION OF THE DRAWINGS

The invention is now described in further detail, by mere way of example, with reference to the accompanying drawings, which illustrate some preferred embodiments thereof and in which.

DESCRIPTION OF THE PREFERRED EMBODIMENTS

Figure 1:
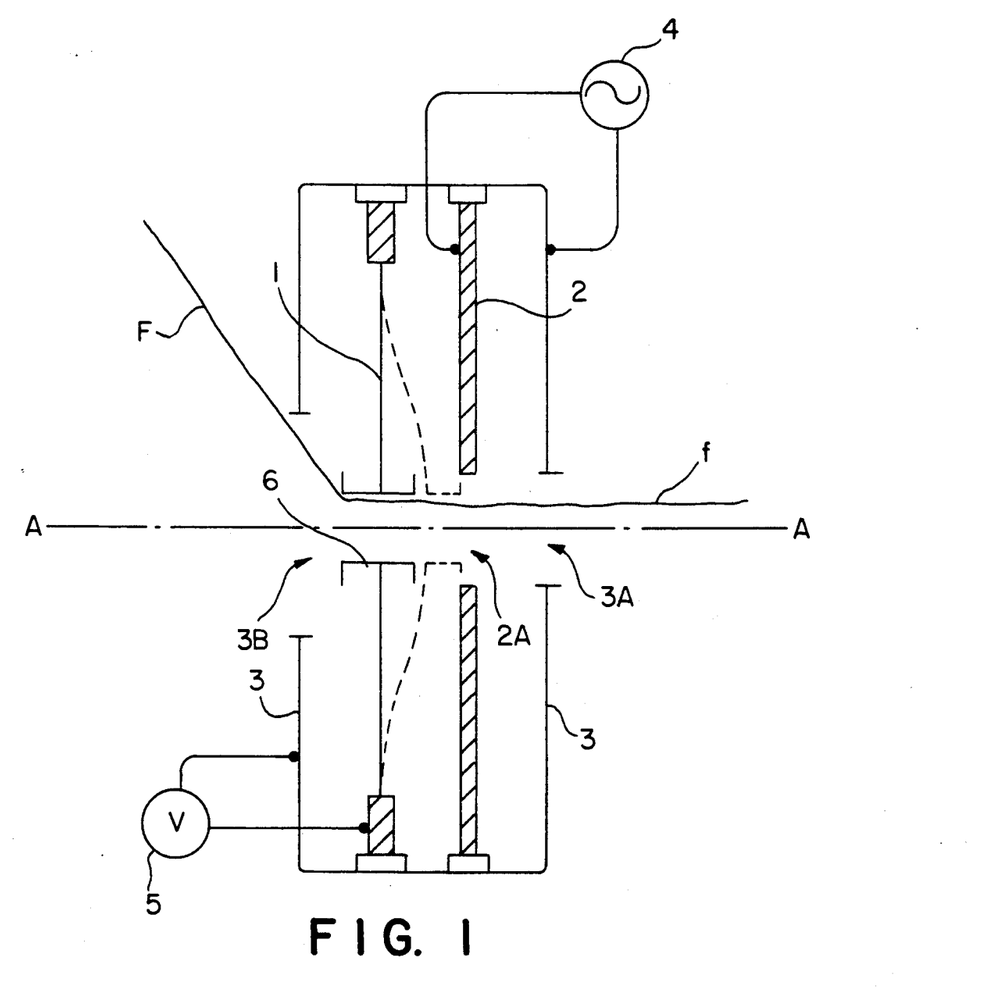
FIG. 1 is a general diagram showing a yarn tension measuring instrument (or tensiometer) of the type with variable impedance according to the invention.

As shown in FIG. 1, the instrument for measuring yarn tension (or tensiometer), of the type with variable impedance according to the invention, comprises a movable component 1 positioned insulated between two fixed components 2 and 3 which are also reciprocally insulated. The fixed component 2 acts as a hot plate, while the fixed component 3 acts as a cold plate and as protective screen. The fixed components 2 and 3 are fed with a constant voltage by a high-frequency generator 4 while a voltmeter 5 connected to the movable component 1 allows to measure the variable voltage on the movable component 1.

All three components 1, 2 and 3 of the tensiometer have a centered symmetry and are crossed in proximity of and along their central axis A—A by the yarn f whose tension has to be measured; the yarn freely crosses the fixed components 2 and 3 in correspondence of their wide openings 2A and 3A, 3B, without contacting them, while it engages the movable component 1 in correspondence of a central eyelet 6 thereof, narrower than the openings, placed at the vertex of a "balloon" formed by the yarn f (for instance at the outlet of a weft feeder, or at the inlet of a spinner) in order to close the "balloon", without thereby requiring or causing any further yarn deviations in order to carry out the measurement of its tension.

As the tension of the yarn f varies, the movable component 1 of the aforedescribed tensiometer undergoes changes in its position, to which there correspond changes of the voltage thereon, measured by the voltmeter 5: thus, the voltage read on the voltmeter represents at each moment the tension of the yarn on component 1.

Figure 2:
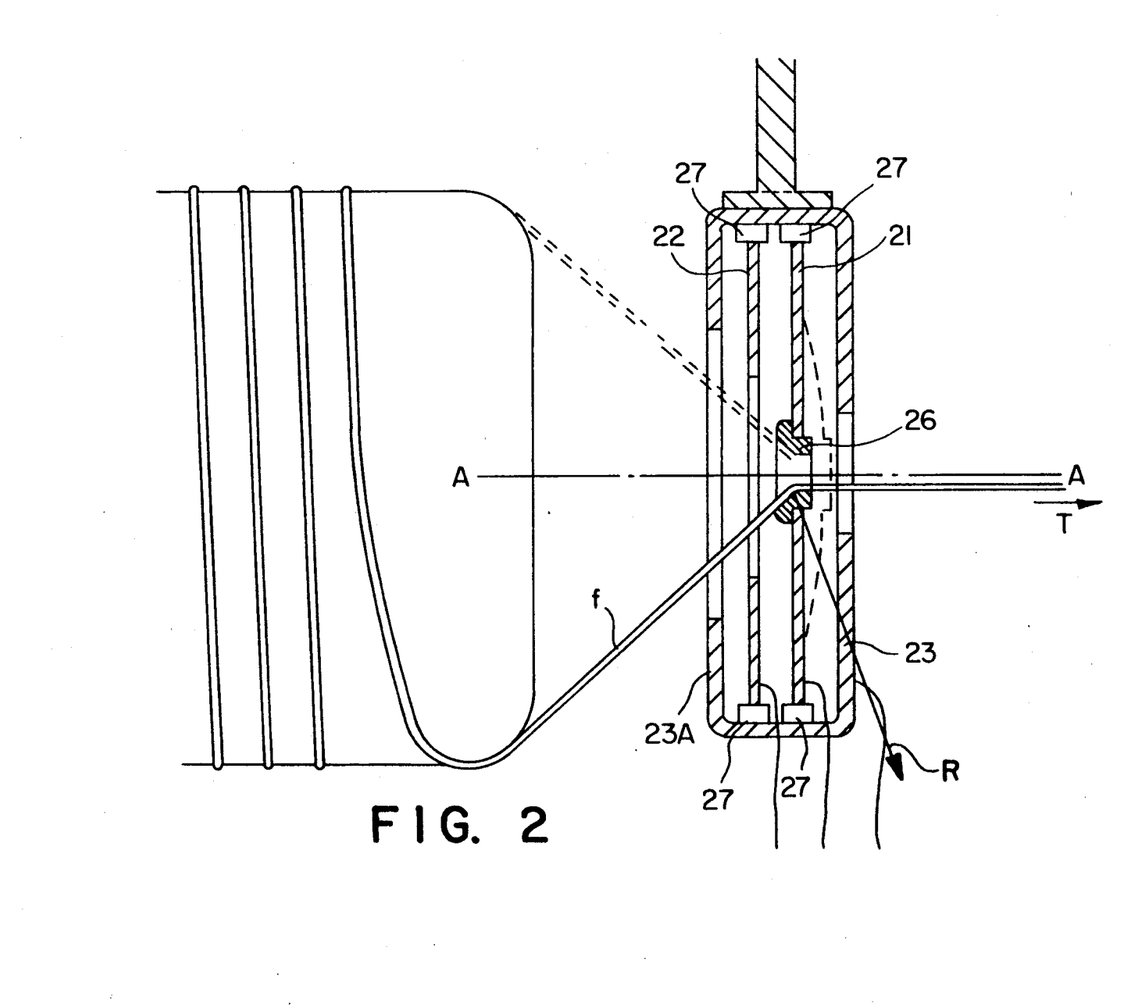
FIG. 2 shows diagrammatically a first embodiment of the instrument according to the invention, with capacitive variable impedance (consisting of a differential capacitor)

FIG. 2 shows how a yarn tension measuring instrument with capacitive impedance according to the invention, for the feeding of weft yarns from a weft feeder to a loom, can be formed according to the general structure described heretofore.

The instrument shown in FIG. 2 essentially consists of a differential capacitor comprising four side-by-side surfaces 21, 22, 23, 23A (which can be either metallic laminae, or metal surfaces on supports of ceramic material), having a central passage along their common axis A—A and kept reciprocally spaced by insulating spacers 27 of suitable thickness. The surfaces 23 and 23A form fixed unipotential plates, electrically connected to the cold pole of a high-frequency generator and to the earth of the system, and they also act as an electromagnetic screen to prevent any neighbouring external conductive bodies from influencing the measurement; the surface 22 forms an equally fixed plate, connected to the hot pole of the generator; finally, the surface 21 connected to the detection circuit (measuring voltmeter) forms a movable plate consisting of a thin and elastic metallic lamina, stretched during construction of the device (or, alternatively, of a highly rigid ceramic body covered by a metal surface); an eyelet 26 of dielectric material is applied at the center of the lamina 21.

Considering in detail the working of the instrument shown in FIG. 2, it can be noticed that the change of direction imparted on the yarn f by the eyelet 26 is determined by an exchange of forces between the two bodies, which finally issues into a reaction force R on the constraint of the eyelet, whose direction and modulus depend on the yarn tension T to be measured, on the inlet and outlet angles with respect to the eyelet axis, on the friction stresses between yarn and eyelet, and on secondary effects determined by yarn rotation and by the characteristics of flexibility of the lamina 21.

The reaction force R anyhow results proportional to the tension T and thus, by resolving R into its components along axis A—A and in a direction orthogonal thereto—seen the symmetry of the system—the component normal to A—A disposes itself (very approximately) in the plane of the movable lamina 21 and is balanced by the radial reaction of the lamina (which is very stiff), while the component acting along A—A is balanced by the elastic axial reaction determined by a slight flexure of the lamina 21 in the direction of the axis A—A (a few millimeter hundredths) which flexure is directly proportional to the weft yarn tension T.

The relative movement of the movable plate 21 with respect to the fixed plates 22 and 23, 23A, issues—from the electrical point of view—into a change of ratio of the capacities, which influences the value of the voltage on the movable plate 21, read by the voltmeter connected thereto and forming part of the instrument.

The symmetry of the structure of the instrument S allows to carry out the measurement along the whole moving path of the yarn being wound or unwound, since the position of the yarn creates only slight indeterminations forming part of the expected measuring errors; in practice, therefore, if the relative position of the weaving or spinning members involved remains constant, one may avoid—as wished and as already pointed out—to use an eyelet at the outlet of the members, by deviating the yarn at the outlet of the "balloon" directly through the eyelet 26 of the movable lamina 21.

The technique of the differential capacitor—though known and used in instruments of various types—is rather novel in the specific case of the invention, feature thanks to the geometry adopted in the structure of the capacitor, which allows to carry out the tension measurement without forcing the yarn to follow winding paths on small diameter transmissions, with consequent considerable altering of the tension and increase in accidental yarn breakages, which prejudice the efficiency of the loom and the quality of the yarn and/or of the textile product being treated.

In other words, the instrument according to the invention is adapted to measure the tension of a yarn without having to first modify the path of the yarn; in fact, according to the invention, one actually takes advantage of the mechanism forming the cone of the "balloon", to generate the axial force of flexure of the movable lamina. This solution allows furthermore to realize a very compact measuring instrument, which can be easily associated to the weaving and spinning devices with which it has to cooperate, by being for instance mounted at the outlet of a weft feeder. It can besides work also autonomously, for example in combination with sliding sensors of the piezoelectric type.

Figure 3:
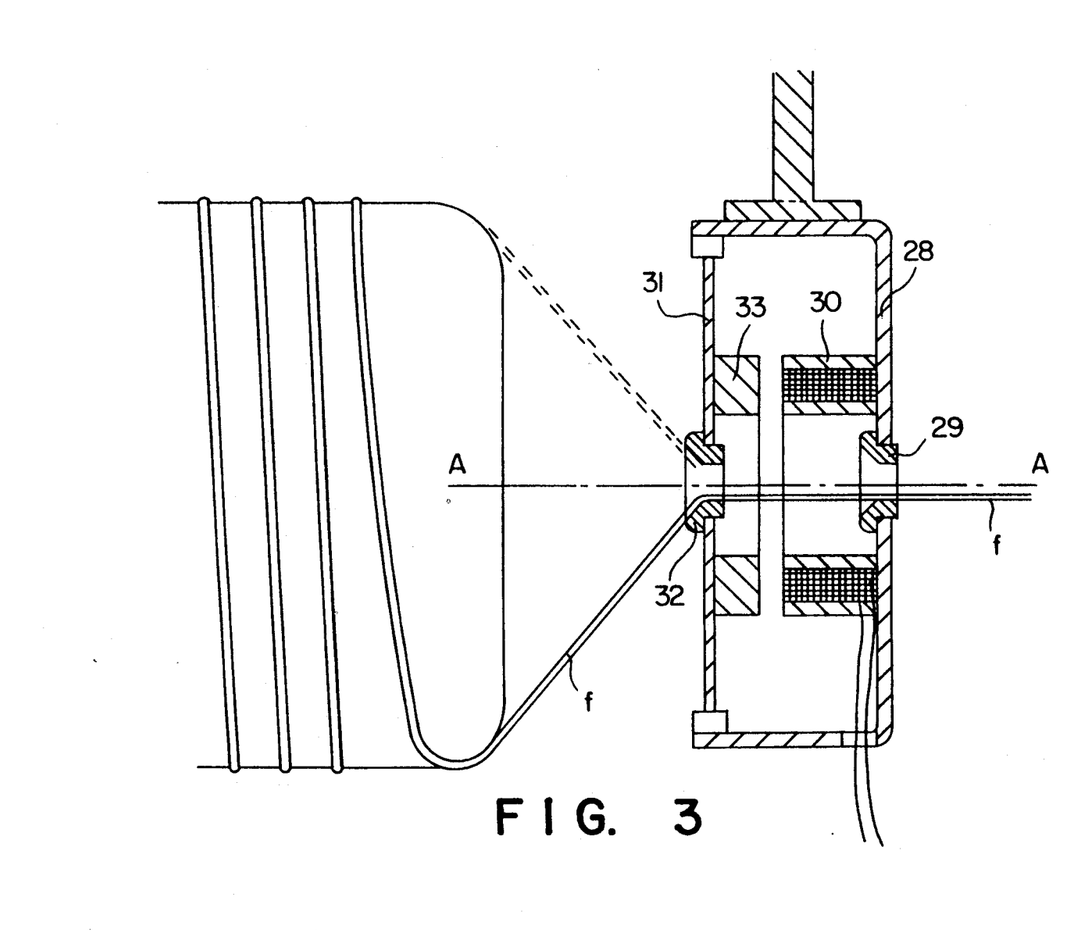
FIG. 3 shows diagrammatically a second embodiment of the instrument according to the invention, with inductive variable impedance (consisting of a variable inductor)

FIG. 3 shows how the instrument according to the invention can be realized using—as an alternative to a differential capacitor—a variable inductor.

According to this embodiment, the instrument of the invention comprises a fixed electromagnetic component, consisting of a support structure 28 centered on a yarn guiding eyelet 29 and of an electromagnetic coil 30 centred on the eyelet 29 and fed by an oscillator, and a movable component consisting of a metallic lamina 31 having a central yarn guiding and deviating eyelet 32 aligned with the guiding eyelet 29 of the fixed component. The lamina 31 carries around the eyelet 32 an element 33 of highly permeable material, adapted to close the magnetic circuit of the coil 30 in respect of which it has an air gap of a few millimeter tenths. The axial deformation of the lamina 31, due to yarn tension, causes variations in the size of the air gap and, consequently, variations of inductance of the coil 30. The voltage being measured at the poles of the coil depends on the movements of the lamina 31 and appears to be a function of yarn tension.

The instrument according to the invention lends itself particularly well for application—as already mentioned—in the feeding to looms through a weft feeder.

It can in fact be advantageously mounted at the end of a conventional weft feeder, in replacement of the usual yarn outlet eyelet, or be otherwise associated to the weft feeder, between the same and the loom to be fed.

Figure 4:
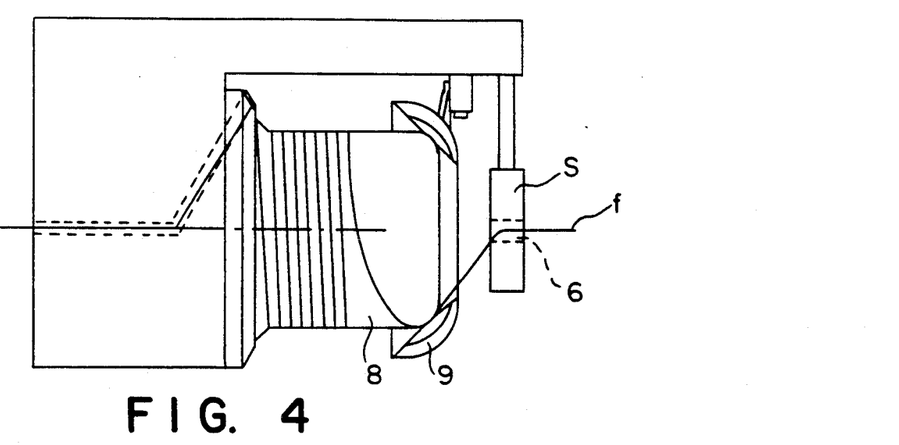
FIGS. 4, 5 and 6 show three different ways to associate the instrument according to the invention to weft feeders for gripper looms equipped with different braking systems.
Figure 5:
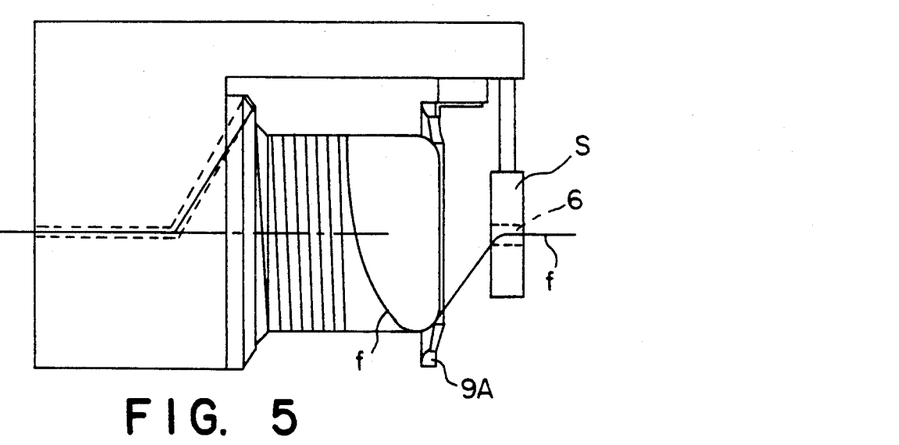
Figure 6:
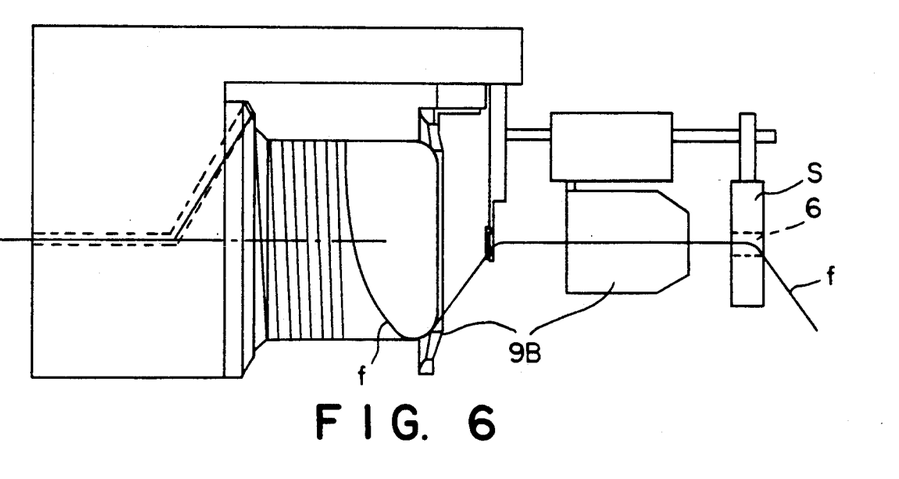

FIGS. 4, 5 and 6 show three different ways to associate a measuring instrument S according to the invention to weft feeders equipped with different systems of braking the outgoing yarn fed to the loom.

The weft feeder of FIG. 4 comprises a metallic brake, while the weft feeder of FIG. 5 is equipped with a brush brake, and the weft feeder of FIG. 6 has a brush brake associated to a double-leaf brake.

The weft yarn f, wound on the weft feeder drum 8, is let through the brake device—9, 9A and 9B respectively—and is deviated by the eyelet 6 of the movable component of the instrument S, to be subsequently drawn by the loom with a pulling force which depends on the braking value preset on the weft feeder and which is measured by the instrument S.

In weft feeders equipped—like those of FIGS. 4, 5 and 6—with a tensiometer according to the invention, the fact of disposing of an electric signal proportional to weft yarn tension facilitates the use of automatic devices to check and modulate yarn braking, by causing the brake element upstream of the tensiometer to act in dependance of the tension measurement.

Figure 7:
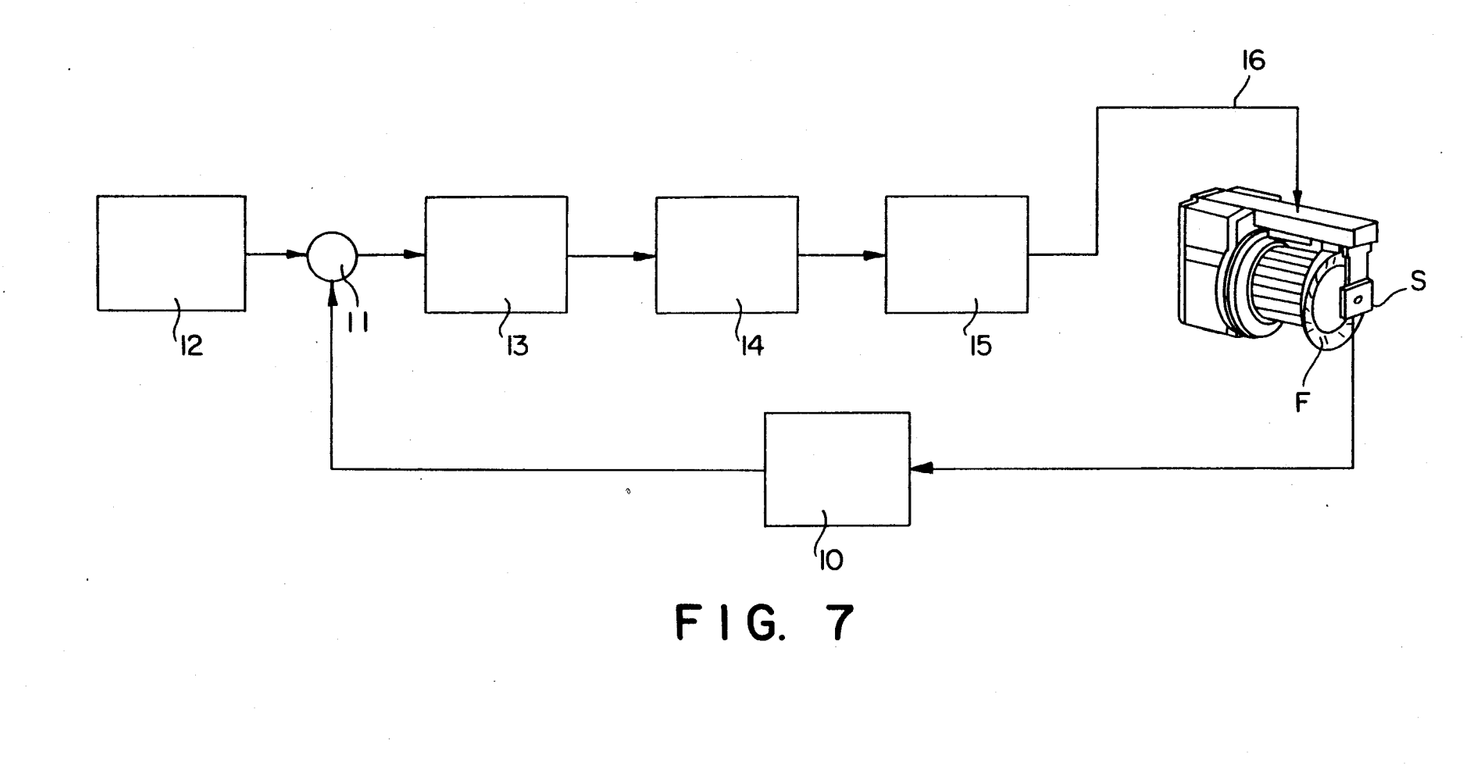
FIG. 7 is a block diagram showing how the present invention allows to check and modulate the tension of the yarn being fed from a weft feeder for gripper looms, by causing its brake devices to act in dependence of the tension measurement carried out by the instrument associated to said weft feeder.

Referring to the block diagram of FIG. 7—and leaving out of consideration the type of brake adopted (whether associated to the weft feeder or separate therefrom)—it can be seen that the electric signal issued by the tensiometer S, associated to the weft feeder downstream of its brake unit F, is previously processed in 10 so as to be able to obtain from the signal the required information (mean value, peak value, or other data); this information is compared in 11 with a reference value which can be preset by the user through a programming and visualizing device 12; the error signal derived therefrom is suitable amplified in 13 and frequency limited in 14, so as to guarantee the desired parameters of stability, precision and speed of the system; at this point, the control signal, after having undergone an adequate power increase in 15, is sent to the mechanical actuator of the weft feeder brake unit F, which changes the braking conditions. These conditions are obviously measured by the tensiometer, so as to close the control circle of the system.

It is evident that the processing of the signal issued by the instrument S can be done both in an analogue and in a digital way (introducing the appropriate conversion stages) and that, if the system operates in association with a pre-feeder, it is possible to adopt the same control electronics of this last device for processing the information.

As stated above, the aforementioned type of use of the instrument according to the invention allows to adjust yarn tension in a positive way, by presetting the required value thereof and keeping the value constant—upon varying of the parameters which may influence the same— not only in the long run on the same machine, but also on other machines, thereby making uniform the yield in quantity and quality of a whole weaving room.

In the case of fluid jet looms, the instrument according to the invention finds another very useful application; it can in fact be used to measure the tension of the weft yarn unwinding from a measuring weft feeder and to operate loom adjustments with a feedback action, so as to allow the most correct weft insertion.

It is known in fact that, in the modern fluid jet (air or water) weaving technique, weft insertion is carried out through a main nozzle, mounted on the sley close to the reed, and possibly through other secondary nozzles positioned along the reed; furthermore, a pre-nozzle can be provided to facilitate insertion, positioned upstream of the main nozzle and generally forming part of the fixed structure of the loom.

Since this arrangement includes no mechanical weft carrying members, the pulling force on the yarn to be inserted is very limited and the yarn is drawn with the lowest possible tension by a measuring weft feeder, the winding unit of which is configured so as to oppose the slightest possible resistance to unwinding.

It is moreover indispensable for the yarn to reach the main nozzle without undergoing any deviations which would inevitably create tension increases.

A high weft yarn tension lengthens the insertion times and, to avoid this inconvenience, it is necessary to operate loom adjustments by increasing the fluid pressures and/or the blowing times.

It should be noted that, in spite of the various construction expedients adopted to limit the tension of the yarn at the outlet of the winding unit of the measuring weft feeder, the very fast and irregular unwinding of the yarn, with forming of a "balloon" which is typical of the "defilé" unwinding, creates a certain tension in the yarn, which is tied both to the unwinding conditions and to the characteristics of the yarn itself.

It is not easy to measure the yarn tension with the conventional tensiometers, which force the yarn to undergo a deviation thereby creating additional tensions.

The use of a yarn tension measuring instrument as that according to the invention allows instead to efficiently solve the problem since, in the case of a "defilé" unwinding, the instrument can be applied in correspondence of the eyelet at the outlet of the measuring weft feeder.

Figure 8:
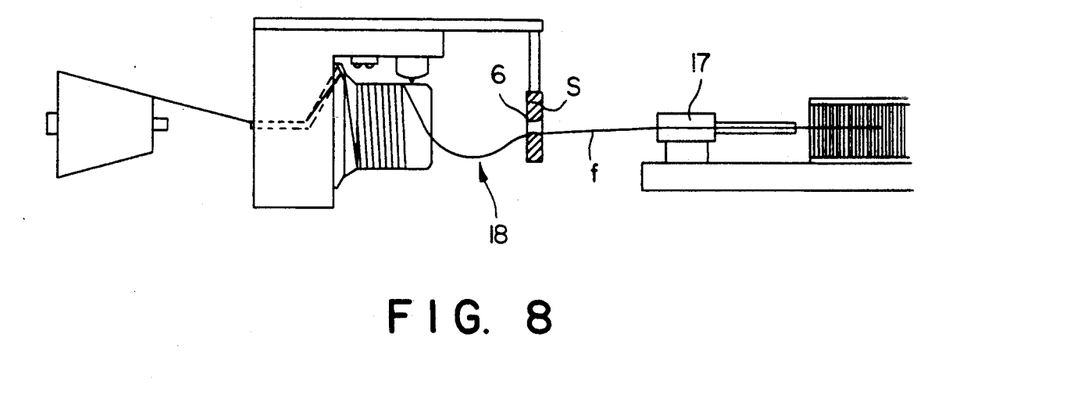
FIGS. 8, 9 and 10 show three different ways to associate the instrument according to the invention to the measuring weft feeder of a fluid jet loom.

FIG. 8 shows a measuring weft feeder, onto the outlet of which there is applied an instrument S according to the invention. The weft yarn f outcoming from the eyelet 6 of the instrument—which is also the eyelet at the outlet of the feeder—is drawn by the loom through the main nozzle 17. The forming of the "balloon" 18 causes the sliding of the yarn through the eyelet 6 and the force imparted thereon is detected by the tensiometer S.

This allows to measure the tension of the weft yarn, without making use of any measuring instruments which may have an influence on the tension and alter the same.

Some constructions of measuring weft feeders do not make use of an outlet eyelet, but the unwinding yarn is directly inserted into the main nozzle or into a pre-nozzle.

In this case, the tensiometer can be applied just upstream of the nozzle or pre-nozzle, without thereby altering the geometry of the yarn path during its insertion.

Figure 9:
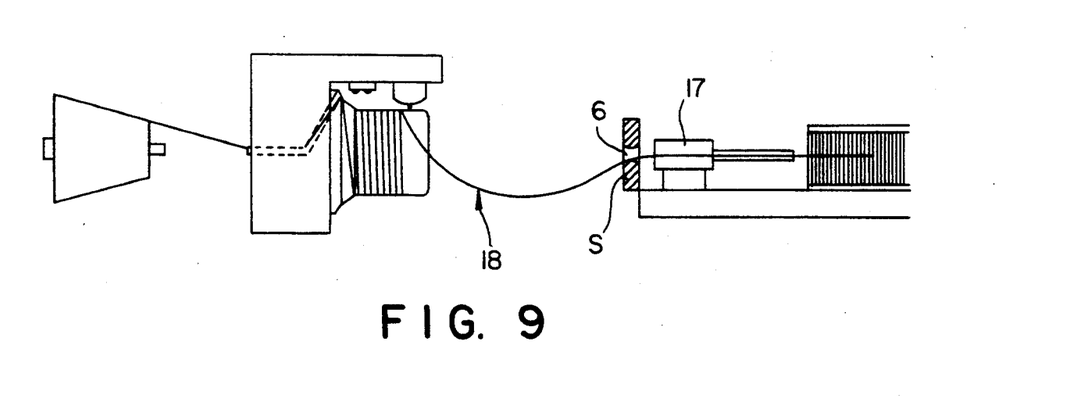

FIG. 9 shows the tensiometer S applied on the sley of a loom, quite close to the inlet into the main nozzle 17; in this case, the tensiometer S indicates the tension created by the forming of the "balloon" 18 and the tension increase produced by the reciprocal motion between the sley and the measuring weft feeder.

It is extremely useful to be able to dispose of an instrument adapted to measure the tension of weft yarns during their insertion, in that it first of all allows to reduce the tension to a minimum, by acting on the reciprocal position between the measuring weft feeder and the loom; it is moreover possible to produce a feedback action, so as to be able to act on the loom operating parameters by analyzing the tension variations registered through short or long periods.

It is known in fact that, in spite of the efforts being made to reduce the inlet tension to a minimum, weft yarn tension variations often occur during normal working of the loom, and such variations generally result into variable insertion times.

A weft insertion with higher tension corresponds to a longer insertion time, and viceversa.

Tension variations are, for example, caused by the reel winding conditions, by the yarn structural changes, and by variations of the enzymes in the yarn, which cannot be always and fully neutralized by interposing a measuring weft feeder.

This determines changes in the weft insertion times; it is very important to verify whether the change of these insertion times is occasional or whether, during the loom working period, such times tend to grow longer or shorter.

It is seldom possible and convenient to intervene if the change of the weft insertion times is occasional; it is instead very helpful to be able to intervene in the event it may be possible to reckon any specific time tendencies.

The instrument according to the invention is actually suited for this purpose.

In fact, the signal issued by the tensiometer, suitably processed, can be used to correct the weft insertion times determined by the aforecited tendencies.

As known, in fact, it is possible to vary the weft insertion times by varying, for example, the pressures with which yarn is fed to the main nozzle and to the secondary nozzles (or the blowing times).

Figure 10:
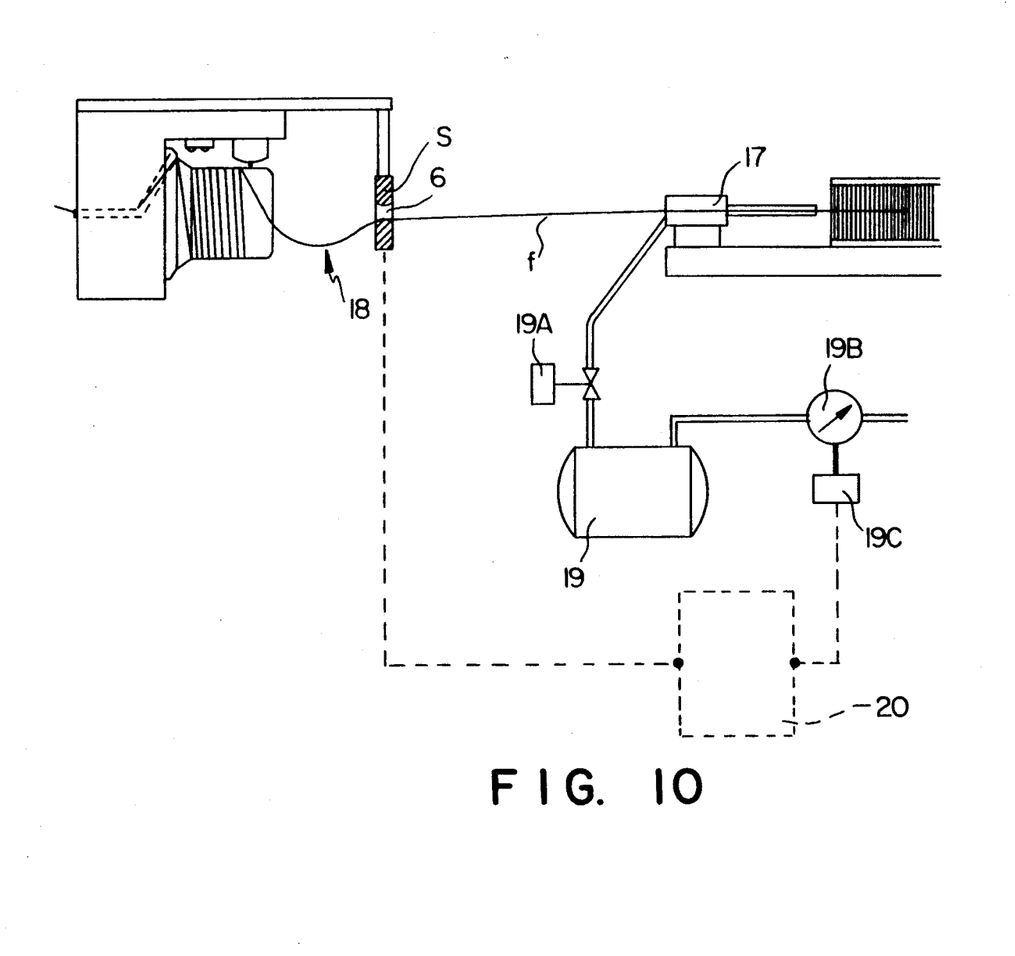

FIG. 10 is a diagram showing weft yarn feed in an air jet loom with measuring weft feeder, wherein use is made of an instrument S according to the invention in the form of an outlet eyelet 6, as in the case of FIG. 8. This instrument detects the tension of the weft yarn f being inserted into the loom through the nozzle 17 which is intermittently supplied with compressed air from a reservoir 19.

The law by which air is supplied to the nozzle 17 is regulated by the actuator 19A, while the air pressure in the reservoir 19 is regulated by the pressure regulator 19B.

The signal issued by the tensiometer S, suitably processed through the signal processor 20, is used to vary the air pressure in the reservoir 19—to be supplied to the main nozzle 17—by acting on the pressure regulator 19B through the actuator 19C associated thereto.

One thus realizes a device with feedback action, allowing to vary the pressure of the air supplied to the main loom nozzle, by making use of the weft yarn tension value detected by a tensiometer, which does not alter—due to the constructive typology adopted—the tension values present on the yarn.

The example illustrated in FIG. 10 shows how to regulate the pressure of the air fed to the main nozzle; nevertheless, the feedback action can be adopted also to regulate the pressure of the air fed to the secondary nozzles and/or to regulate the blowing times of the main nozzle and of the secondary nozzles.

Obviously, the aforespecified regulations with feedback action can be adopted singly, or in different combinations, so as to reach the highest efficiency.

What is claimed is:

1. In an instrument for measuring the tension of weft yarns which wind or unwind forming a "balloon", of the type using a variable impedance comprising a movable component and at least one fixed component as parts of an electric measuring circuit, the improvement wherein all of the components have a centered symmetry and a passage through their center for the yarn whose tension is to be measured, with a yarn guiding and deviating eyelet positioned in correspondence of the closing vertex of the "balloon" and fixed to the movable component of said variable impedance, a voltage measuring device connected to said movable component for measuring the variable voltage detected on one of the components of said impedance as a function of the tension of the yarn sliding through said eyelet.

2. Measuring instrument as in claim 1, wherein said variable impedance is a capacitive variable impedance consisting of a differential capacitor.

3. Measuring instrument as in claim 2, wherein said differential capacitor comprises four side-by-side surfaces having a centered symmetry and a central passage along their common axis, two of said surfaces forming a first fixed component, the third one forming a second fixed component, and the fourth one forming the movable component of the capacitor, said components being kept reciprocally spaced by insulating spacers and the fixed components being fed with a constant voltage by a high-frequency generator, while the movable component is connected to said voltage measuring device for measuring the voltage thereon.

4. Measuring instrument as in claim 3, wherein the first of said fixed components acts as a cold plate of the differential capacitor, while the second one acts as a hot plate.

5. Measuring instrument as in claim 4, wherein the fixed component acting as the cold plate of the differential capacitor also acts as a protective screen therefor.

6. Measuring instrument as in claim 3, wherein said surfaces forming the fixed components are metallic laminae.

7. Measuring instrument as in claim 3, wherein said surfaces forming the fixed components are, at least partly, metal surfaces on ceramic supports.

8. Measuring instrument as in claim 3, wherein said surfaces forming the fixed components are circular.

9. Measuring instrument as in claim 3, wherein said surface forming the movable component consists of a thin elastic metal lamina under tension.

10. Measuring instrument as in claim 3, wherein said surface forming the movable component is a metal surface on a stiff ceramic support.

11. Measuring instrument as in claim 3, wherein said surface forming the movable component is circular.

12. Measuring instrument as in claim 1, wherein said variable impedance is a variable inductor fed by an oscillator.

13. Measuring instrument as in claim 12, wherein the fixed component of said variable inductor is an electromagnetic coil fed by said oscillator, and the movable component of said variable inductor is a lamina of ferromagnetic material, or carrying a ferromagnetic element, adapted to close the magnetic circuit of said coil, and said voltage measuring device being applied to the coil for measuring the voltage thereon.

14. The combination of a weft feeder for looms equipped with a drum and an outlet positioned on the main axis, and an instrument for measuring the tension of weft yarns which wind or unwind forming a "balloon", said instrument using a variable impedance and comprising a movable component and at least one fixed component as parts of an electric measuring circuit, said instrument being positioned on the main axis of the weft feeder so as to measure the tension of yarn unwinding from the drum and being fed to the loom on which the feeder is applied, said components having a centered symmetry and a passage through their center for the yarn whose tension is to be measured, with a yarn guiding and deviating eyelet positioned in correspondence of the closing vertex of the "balloon" and fixed to the movable component of said variable impedance, a voltage measuring device connected to said movable component for measuring the variable voltage detected on one of the components of said impedance as a function of the tension of the yarn sliding through said eyelet.

15. The combination as in claim 14, wherein the weft feeder includes brake devices for gripper looms, and wherein means are provided in response to signals generated by said instrument which represent the tension of the unwinding yarn, for checking and modulating the tension, by adjusting the brake devices of the weft feeder.

16. The combination as in claim 15, wherein said means include a comparator for comparing said signals with reference signals, indicating the tension required for the unwinding yarn being fed to the loom on which said feeder is applied.

17. The combination as in claim 14, wherein said feeder is of the measuring type for fluid jet looms, and wherein means are provided which use the signals of said instrument for regulating fluid pressure operating the loom, with a feedback action.

* * * * *